(12) United States Patent
Gattegno

(10) Patent No.: US 8,661,433 B2
(45) Date of Patent: Feb. 25, 2014

(54) SYSTEMS AND METHODS OF CREATING A RESTORABLE COMPUTER INSTALLATION

(75) Inventor: Yves Gattegno, L'Hay les Roses (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 185 days.

(21) Appl. No.: 13/260,359

(22) PCT Filed: Oct. 30, 2009

(86) PCT No.: PCT/US2009/062768
§ 371 (c)(1),
(2), (4) Date: Sep. 25, 2011

(87) PCT Pub. No.: WO2011/053312
PCT Pub. Date: May 5, 2011

(65) Prior Publication Data
US 2012/0023491 A1   Jan. 26, 2012

(51) Int. Cl.
*G06F 9/44*   (2006.01)
*G06F 9/445*  (2006.01)

(52) U.S. Cl.
USPC ........... 717/175; 717/100; 717/104; 717/105; 717/109; 717/121; 717/124; 717/135; 717/174; 717/177; 717/178

(58) Field of Classification Search
None
See application file for complete search history.

(56) References Cited

U.S. PATENT DOCUMENTS

| | | | |
|---|---|---|---|
| 5,361,360 A | 11/1994 | Ishigami et al. | |
| 6,202,121 B1 * | 3/2001 | Walsh et al. | 711/100 |
| 6,959,320 B2 * | 10/2005 | Shah et al. | 717/174 |
| 7,496,888 B2 * | 2/2009 | Sanjar et al. | 717/105 |
| 7,643,982 B2 * | 1/2010 | Sanjar et al. | 717/135 |
| 7,770,151 B2 * | 8/2010 | Sanjar et al. | 717/109 |
| 7,797,678 B2 * | 9/2010 | Moulckers et al. | 717/121 |
| 7,865,579 B2 | 1/2011 | Birse et al. | |
| 8,261,232 B2 * | 9/2012 | Devarakonda et al. | 717/104 |
| 2002/0010910 A1 | 1/2002 | Crudele et al. | |
| 2002/0156877 A1 * | 10/2002 | Lu et al. | 717/178 |
| 2002/0157089 A1 * | 10/2002 | Patel et al. | 717/178 |
| 2002/0174139 A1 * | 11/2002 | Midgley et al. | 707/204 |
| 2005/0154759 A1 * | 7/2005 | Hofmeister et al. | 707/104.1 |
| 2005/0262501 A1 | 11/2005 | Marinelli et al. | |

(Continued)

FOREIGN PATENT DOCUMENTS

WO   WO-2009109925   9/2009

OTHER PUBLICATIONS

Daniel Bayer et al.,The handbook to Dynamic Runtime Environments, May 29, 2007, [Retrieved on Oct. 22, 2013]. Retrieved from the internet: <URL: http://www.knowarc.eu/download/D2.5-1_documentation.pdf> 31 Pages (1-31).*

(Continued)

*Primary Examiner* — Don Wong
*Assistant Examiner* — Anibal Rivera

(57) ABSTRACT

A method for creating a restorable computer installation includes performing a master software installation on a master drive in a computer system using sources of files available to an end-user. A source package is created including files that cannot be restored from the sources of files used in the master software installation. A file is excluded from the source package. Restore information is included in a catalog record of a catalog file, the catalog record corresponding to each file in the master software installation.

14 Claims, 4 Drawing Sheets

(56) References Cited

U.S. PATENT DOCUMENTS

| | | | |
|---|---|---|---|
| 2006/0248511 A1* | 11/2006 | Sanjar et al. | 717/124 |
| 2006/0248524 A1* | 11/2006 | Seely | 717/174 |
| 2009/0157419 A1* | 6/2009 | Bursey | 705/1 |
| 2009/0158268 A1 | 6/2009 | Pichetti et al. | |
| 2009/0185690 A1* | 7/2009 | Herrero et al. | 717/177 |
| 2010/0058325 A1* | 3/2010 | Macken et al. | 717/174 |

OTHER PUBLICATIONS

ISA/KR, International Search Report dated Jul. 29, 2010, PCT/US2009/062768 filed Oct. 30, 2009.

* cited by examiner

| PATH ON MASTER DRIVE | SOURCE REPOSITORY | EXTRACTION METHOD | SOURCE PATH |
|---|---|---|---|
| \WINDOWS\REGEDIT.EXE | WIN XP INSTALL CD | COPY | \I386\REGEDIT.EXE |
| \WINDOWS\REGEDIT.HLP | WIN XP INSTALL CD | EXPAND | \I386\REGEDIT.HL_ |
| \WINDOWS\SYSTEM32\DRIVERS\DSKIMG.SYS | HPIM.ZIP | UNZIP | DSKIMG\DSKIMG.SYS |
| | | | |

Fig. 4

SYSTEMS AND METHODS OF CREATING A RESTORABLE COMPUTER INSTALLATION

RELATED PATENT DATA

Cross-Reference to Related Application

This application claims priority to PCT Patent Application Serial No. PCT/US2009/062768, which was filed on Oct. 30, 2009 which is herein included by reference in its entirety for all purposes.

BACKGROUND

Computer systems generally require the installation of software including an operating system to perform computing tasks. Software is generally licensed to be installed by a manufacturer or vendor (OEM, original equipment manufacturer) of a computer, or by an end-user. When an end-user installs and configures the software, it may be difficult for technical support to know the logical state of a software installation. Furthermore, there are cases when, e.g., an OEM licensing model is not available, thus making it very difficult to direct the end-user to "restore to factory settings."

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 4 is table depicting exemplary information stored in a catalog file; and

DETAILED DESCRIPTION

Figure 1:
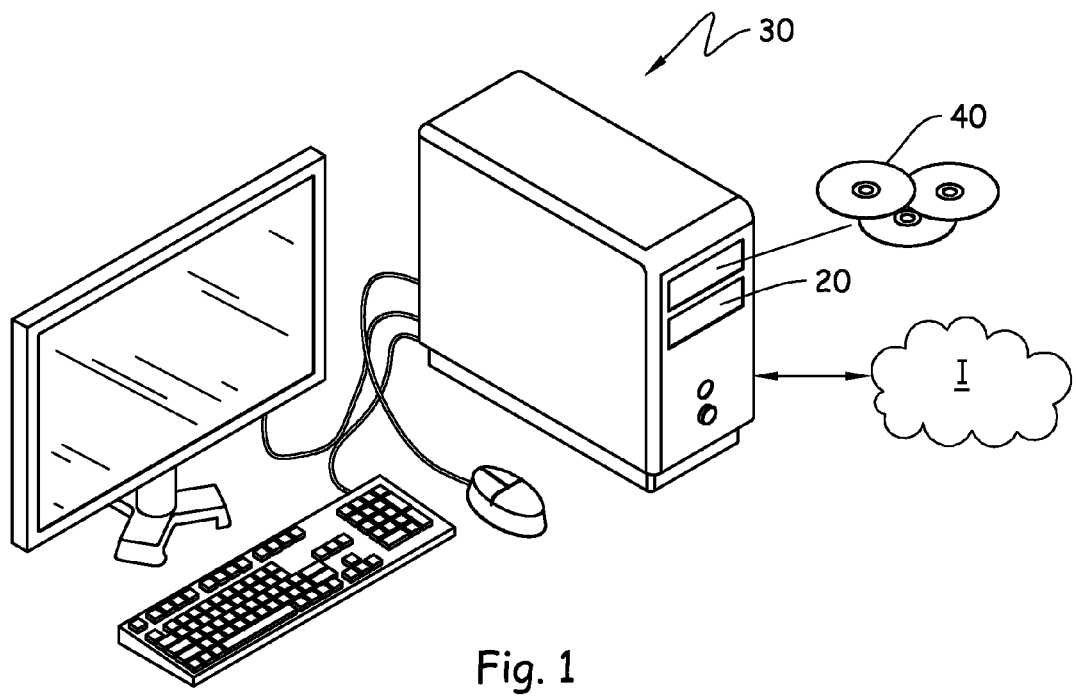
FIG. 1 is a semi-schematic perspective view of a computer system with software sources, for use with embodiments of the present disclosure.

An embodiment of a method as disclosed herein for creating a restorable computer installation includes performing a master software installation on a master drive in a computer system using sources of files available to an end-user. A source package is created including files that cannot be restored from the sources of files used in the master software installation. A file is excluded from the source package. Restore information is included in a catalog record of a catalog file, the catalog record corresponding to each file in the master software installation.

Embodiments of the method 10 and computer-readable medium 60 as disclosed herein create a restorable computer installation that configures a computer to a "factory" or well-known configuration while working within relevant licensing structures. Embodiments as disclosed herein may be useful, for example, in a Virtual Desktop Infrastructure (VDI) environment where an OEM may not be licensed to have an end-uses employ cloning techniques to restore from a backup DVD provided by the OEM. In a VDI environment, there are no OEM operating system (OS) licenses for virtual machine (VM) based clients.

Further, embodiments of the method 10 and computer-readable medium 60 as disclosed herein remove the need to have special "post-installation" tasks (e.g., scripts, executable programs, etc.) that are run after a successful unattended installation, for example to modify access control lists or registry settings. It is to be understood that as used herein, the word "script" means a program or sequence of instructions that is interpreted or carried out by another program rather than by the computer (in contrast to a compiled program which is carried out by the computer).

As mentioned above, previous methods for attempting to create a well known computer installation were unsatisfactory. Those methods included unattended installations and scripting. Unattended installations and scripting may be combined for complex setups, but such combinations are very difficult to set up. Further, it is difficult to verify that the installation will work as expected in each case. Such installations generally fail more than 10% of the time.

An unattended installation "replays" an installation scenario without any user input. However, there is currently no easy way to use unattended installations for complex setups. Building the unattended installation input files requires much effort, as it may be necessary to have an in-depth understanding of the OS and computer architecture in use, for example, to add the necessary set of driver files used to operate hard disk drives if this set of files is not provided in the media used to install the OS to be restored. One other drawback of unattended installations is that the result of the installation may not be what was expected when the unattended installation was designed. Although there may be many causes of unexpected configurations, some of them may be that the user did not provide sources that were used to create an unattended.txt input file, as well as complex interactions between software and hardware. An example of a complex interaction between software and hardware may be found in Plug and Play systems in a Windows OS installation.

Another drawback of unattended installations manifests itself when the installation is made on a variety of computer hardware combinations. For example, computers may have different motherboards, processors, video cards, sound cards, memory and peripherals. Designing an unattended installation to yield a well known software configuration for the myriad of potential hardware combinations becomes complex and difficult to validate/qualify, if even possible.

The present inventor has provided herein a method and computer-readable medium to rebuild a complete and consistent "end-user" licensed software installation without having to provide sources that include licensed or copyrighted software.

As will become apparent upon reference to the present disclosure, embodiments disclosed herein: simplify the complexity of managing and/or supporting an end-user based licensing model; and significantly reduce the amount of data to be transferred/shipped in order to restore some factory/well-known settings. Further, information technology (IT) support teams operating from a central location and supporting remote (e.g., non-technical) users may use embodiments as disclosed herein in order to support, restore or deploy pre-configured settings for the remote users' computers.

Embodiments of the method and computer-readable medium 60 as disclosed herein eliminate a requirement to rebuild an installation on a real (physical or virtual) client that will be used with the rebuilt drive. In embodiments of the method, a target drive 22 can be rebuilt from any client that can run a rebuilder application (according to embodiments herein) and that can access a target drive 22. This makes it possible for an end-user to prepare a target drive 22 that will be made available to actual users of the drive, without having a "real" client at hand when running the rebuilder application.

Further, embodiments of the present disclosure are in contrast to "OEM licensing" models where an operating system is pre-installed and shipped with a computer system 30; and/or where recovery media (having embedded thereon the files that were pre-installed on the target computer) are shipped with the target computer.

It is to be understood that embodiments of the present disclosure may ease operating system (OS) installation/configuration when no OS is shipped with the target computer.

Figure 3:
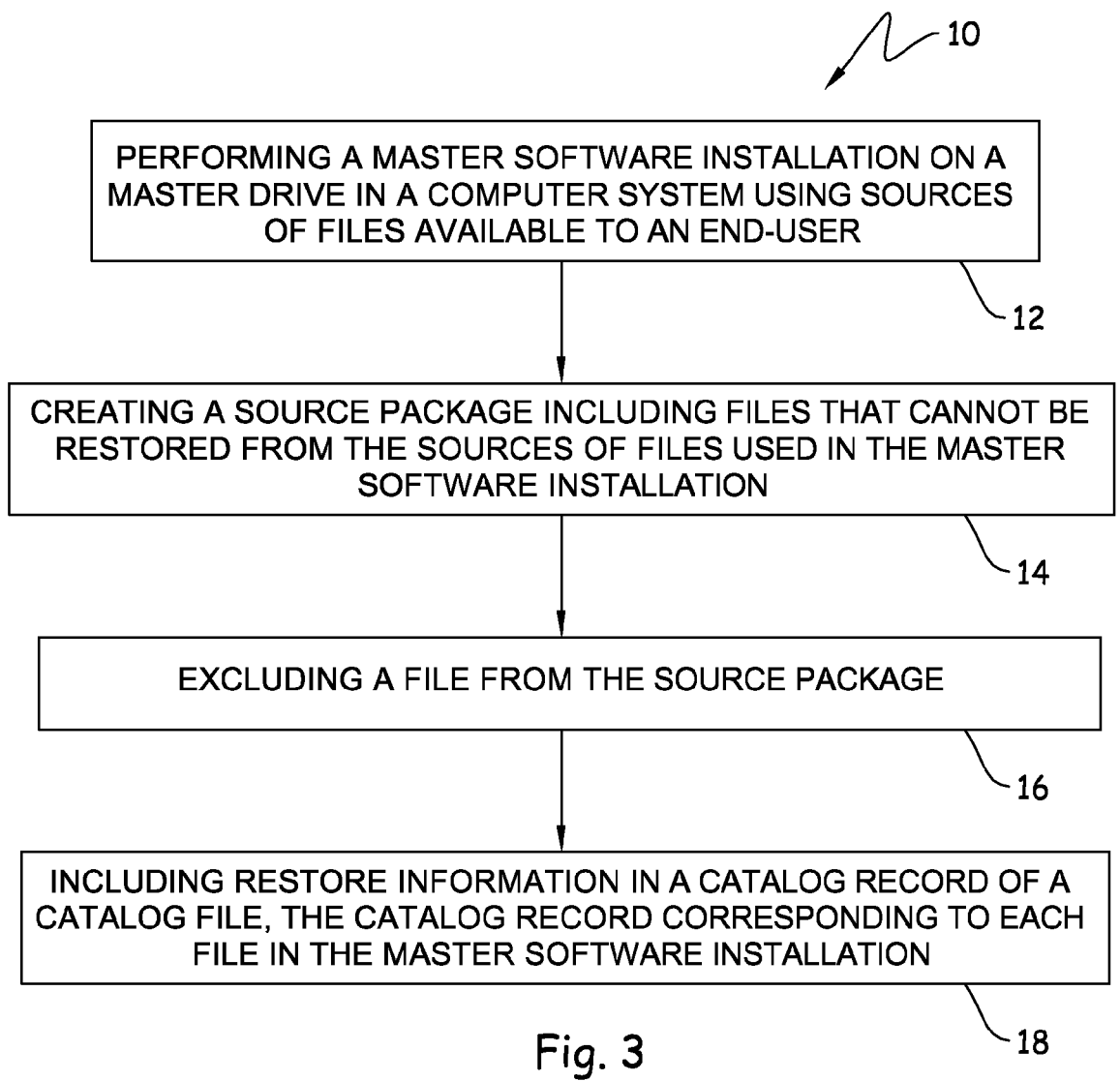
FIG. 3 is a flow diagram depicting an embodiment of a method for creating a restorable computer installation, the embodiment of the method enabled to be carried out by a data structure encoded in a computer medium.

Referring now to FIG. 1 and FIG. 3 together, an embodiment of the method for creating a restorable computer installation is generally designated at reference numeral 10 of FIG. 3. A master software installation is performed on a master drive 20 in a computer system 30 using sources of files 40 available to an end-user, as shown at reference numeral 12.

In embodiments herein, the master software installation may include an operating system, a file system, application or combinations thereof. A non-limiting example of a source of files 40 available to an end-user includes an end-user licensed version of an OS stored on media or an internet I location. It is to be understood that "media" includes any computer-readable object on which data can be stored. Non-limitative examples of media include: hard drives, removable drives, CD-ROM or CD-R discs, DVDs, flash memory, USB drives, floppy disks, shared folders available through a network link, magnetic tape, and the like. Another non-limiting example of a source of files 40 available to an end-user is an installation CD that contains word processing software purchased by an end-user. An example embodiment as disclosed herein may use one or more installation media, e.g., a Microsoft® Windows™ XP installation CD or a Microsoft® Windows™ Vista installation DVD.

A further example of a source of files 40 available to an end-user is the internet I. A successful master software installation may include additional sources of files that are not provided by the source media. For example, OS source media may not include up-to-date drivers. The internet I may be a source of drivers and other files available to an end-user.

In an embodiment, the method may further include configuring the computer system 30 to achieve desired functionality, including setting firewall rule(s), configuring policy/ies, creating user account(s), creating script(s), applying security to a file, setting access rights, and other configuration tasks.

Embodiments disclosed herein may include running a cataloger application on the computer system 30. The cataloger application may create a catalog file on an external storage. Non-limiting examples of the external storage are a network share, a USB drive, an external hard disk drive, a recordable optical drive (CD-R, DVD-R), magnetic tape, floppy disks, etc. The catalog file may include a catalog record corresponding to each file on the master drive 20. The cataloger application may record in the catalog file an identifying code (an example of which is shown at reference numeral 42 in FIG. 4) corresponding to each of the sources of files that are present on the master drive 20. The identifying code 42 may be sufficiently specific to identify, for example, a specific version of an installation CD or DVD, or a universal resource locator (URL). Validation code may also be used, e.g., MD5 hash of files or set of files, etc.

Figure 2:
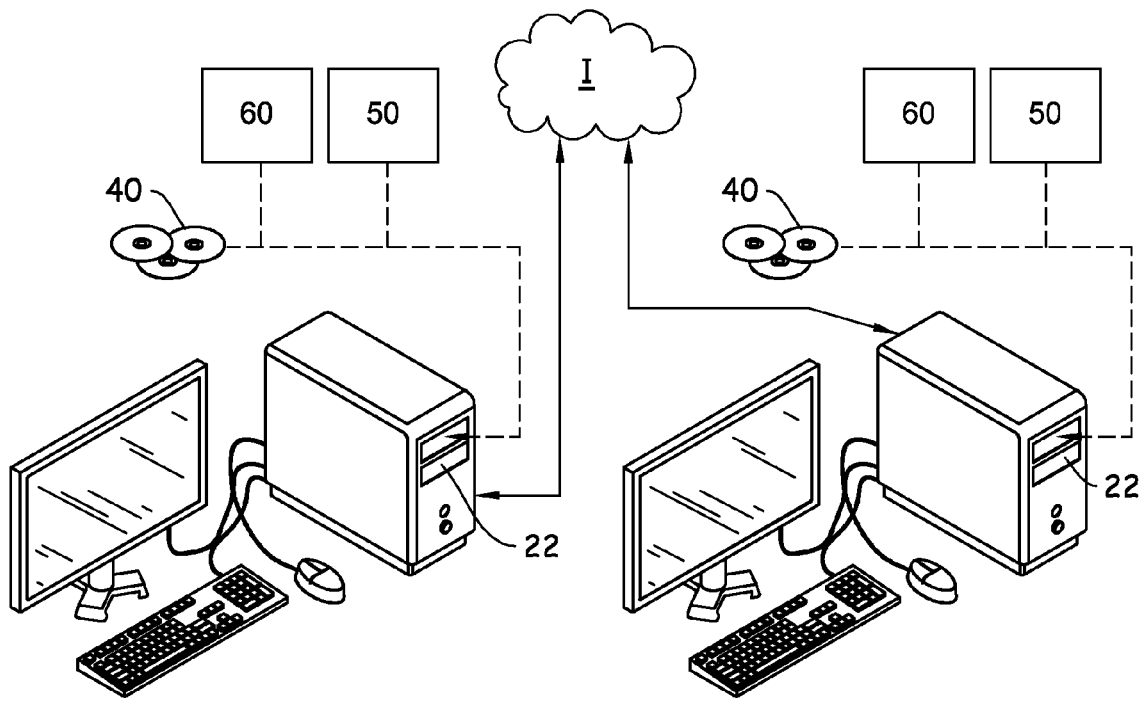
FIG. 2 is a semi-schematic perspective view of target computer systems with software sources, for use with embodiments of the present disclosure.

Referring also to FIG. 2, in an embodiment, the cataloger application may record metadata and rules in the catalog file. Non-limiting examples of metadata include: master boot record (MBR), number of partitions, registry, and configuration information, and the like. It is to be understood that rules may depend on user input, e.g., the number of partitions to process in the source drive, whether it should be processed to force partitioning/formatting of the target drive 22, etc. The catalog record may further contain security information (for example, an access control list (ACL)) for each file. The target drive 22 will have the same or substantially the same security information as the master drive 20 for each object of a file system restored on the target drive 22.

Referring again to FIG. 4, in embodiments herein, the cataloger application may scan each file installed on the master drive 20 and record a corresponding entry in the catalog file. For each catalog record corresponding to each file in the master software installation, the cataloger application may record restore information. The restore information may include an identification of the source of the file (for example, the source repository 41 may be installation media (CD/DVD), a URL, etc.), an example of the identification being shown at reference numeral 42. The restore information may further include a path to a folder containing the file on the source, an example of which is shown at reference numeral 46, a path to a folder containing the file on the master drive 20, an example of which is shown at reference numeral 44, and a method of restoration (for example, instruction to download from the internet I), an example of which is shown at reference numeral 48.

In an embodiment, the cataloger application determines if each file having an entry in the catalog file can be restored from the sources of files 40 used for the master software installation. If so, then details are added to the corresponding catalog entry in order to specify how to restore the file from the source. For example, the cataloger application may use "extract" functions from Windows application programming interface (API) (LZExpand and the like) to extract a copy of a file that is a good candidate to be the source for an installed file, compare the extracted and the installed files, and if they match, record the validated source in the catalog entry for the installed file.

The catalog file may include an existing catalog file that the OS/software installation procedure uses. For example, the layout.inf file on a Windows XP installation CD contains a list of the files and the corresponding destination folder for the files after a Windows setup procedure. An algorithm or rule that is known to be used during installation may be used in populating the catalog file. For example, the Windows XP installation media contains in its \I386 folder all source files as LZCompressed files. Names of the LZCompressed files are the same as the names of destination files except that the last letter of the extension is replaced by a "_" character. To illustrate: the source file for Explorer.exe is \I386\\explorer.ex_. A catalog entry for Explorer.exe may contain details such as ("meta code"): Destination Path=(partition1)\Windows\System32; Source Path=\I386\explorer.ex_; Source repository=1; Restoring method=LZExpand. In an embodiment, the catalog file may be built, and the source path details may be recorded at the same time by a single application.

The catalog file can also include a "Source Repository" section containing details such as:

[Source Repositories]

Source Repository ID = 1
Source Repository 1 Media type= Optical Disk
Source Repository 1 Friendly Name= "Windows 7 Ultimate x86 dvd x15-65921"
Source Repository 1 Validation Method 1 = File details; File=/sources/install.wim; Date=2009/07/14 10:26:40; Size=2188587580;
Source Repository 1 Validation Method 2 = Volume Label; Label= GRMCULFRER_EN_DVD;
Source Repository 1 Validation Method 3 = Volume Serial Number; SN= E3C9-2C86;
Source Repository ID=2
Source Repository 2 Media type= URL; link= ftp://ftp.hp.com/pub/softpaq/sp42001-42500/sp42486.exe
Source Repository 2 Friendly Name= "Broadcom Wireless LAN Driver for Microsoft Windows Vista"
Source Repository 2 Validation Method 1 = MD5sum; Source= ftp://ftp.hp.com/pub/softpaq/sp42001-42500/sp42486.exe; hash=cc509290681412d68c245c4bcf006fa9

Referring still to FIGS. 3 and 4, embodiments as disclosed herein include a step of including restore information in a catalog record of the catalog file, the catalog record corresponding to each file in the master software installation, as shown at reference numeral 18. Restore information includes identification 42 of the source repository 41 and method of restoration 48 for each file in the master software installation.

Embodiments as disclosed herein may include creating a source package 50 including a file or files that cannot be restored from the sources of files used in the master software installation, as shown at reference numeral 14. The catalog record corresponding to a file in the source package 50 indicates that the may be restored from the source package 50. In an example of an embodiment, the cataloger application may create the source package 50 by storing a file in a .zip archive file to be recorded on a CD. In a further embodiment, the cataloger application creates the source package 50; while in yet another embodiment, a packager application may create the source package 50.

It is to be understood that the cataloger application may be run on-line or off-line. As used herein, running the cataloger application on-line means running the cataloger application on the computer upon which the master software installation has been made and used to operate the computer. In the on-line case, the master software installation computer is booted off the drive on which the master software installation has been made. Correlatively, running the cataloger application off-line means the master software installation computer boots off of a separate drive from the drive on which the master software installation is made, and accesses the drive containing the master software installation as an "extra" or secondary data drive, but not as a system drive. For example, if using Microsoft® Windows™ systems, when running the cataloger application in the "off-line" case, the drive containing the master software installation would then usually not be mounted as the C: drive.

Further, it is to be understood that one or more files may be excluded from the source package 50, as shown at reference numeral 16. An example of a file that may be excluded from the source package 50 is a file that is unlicensed to ship. However, the identification 42 of the source repository 41 for the source and a method of restoration 48 for the file that is unlicensed to ship may be stored in the catalog file.

The source package 50 may include files that have been generated by the master software installation (e.g., registry database files and configuration files) and that are needed to operate a system when operated off the target (restored) drive. These files are copied from the master drive 20 to the source package 50.

An embodiment as disclosed herein may include storing a copy of a special disk sector (for example, master boot record (MBR), or volume boot record (VBR)) in at least one specific file embedded in the source package 50. Alternatively, partitioning tools may be used that are available in an end-user copy of sources listed in the catalog file to restore the MBR and VBR, or in the system used to operate the application that will perform the restore/rebuild operation.

Embodiments as disclosed herein may further include recording details about a master software installation file system in a catalog file or in another file. The details about the file system may include, for example: type of file system, boot entries processing rules, quantity of partitions, size of partitions in e.g., megabytes (MB) or percentage of total disk space, etc.

In some embodiments of the present disclosure, the catalog file can embed rules that would be processed prior to or after rebuilding the files of which the master software installation is composed. Some examples of "pre-processing" rules for rebuilding include: creating and formatting a defined number of partitions with their size (in MB or percentage of disk space), formatting existing partitions, activating a given partition (making it the boot partition), and the like. Examples of "post-processing" rules include: process boot entries, change data related to disk signature in configuration entries (such as Registry Databases), modify mount point table, change access rights to some files or folders, and the like.

The cataloger application may execute certain rules prior to or after creating the catalog file. Non limiting examples of pre-processing rules for cataloging include: making a backup of registry or configuration file(s), and modifying the registry or configuration file(s) in the master software installation. These pre-processing rules for cataloging may be configured, e.g., by user input or by configuration data. An example of a post-processing rule for the cataloger application is restoring the backup of original registry or configuration files after the catalog file has been built.

The catalog file built by the cataloger application can also embed details about the operating system installed in the master software installation. These details may be used to enforce some rules when restoring the software installation on the target drive 22. For example, if the OS is Microsoft® Windows™ XP, the rules related to adapting the boot entries would have to process the boot.ini file, and if the OS is Microsoft® Windows™ Vista or Microsoft® Windows™ 7, the rules related to adapting the boot entries would have to process BCD (Boot Configuration Data) entries.

In an embodiment of the method, the restorable computer installation is configured to be restored by running a rebuilder application. The present disclosure also includes a computer-readable medium 60 (as shown in FIG. 2) encoded with a data structure configured to run as the rebuilder application for restoring the computer installation. It is to be understood that computer-readable medium 60 may be any suitable media, including but not limited to hard drives, removable drives, CD-ROM or CD-R discs, DVDs, flash memory, USB drives, floppy disks, shared folders available through a network link, magnetic tape, and/or the like.

The rebuilder application may be configured to validate that the end-user possesses or can access each of the sources included in the catalog file that is not in the source package 50. The rebuilder application may interrupt running of the rebuilder application, or display a warning if the end-user does not possess or cannot access each of the sources included in the catalog file. It is assumed that the end-user can access the source package 50 file. Using the catalog file as an instruction set, the rebuilder may further replicate the master software installation on the target drive 22 using the following sources: the end-user copy of sources listed in the catalog file (which may include sources available through a network link), and the source package 50 as the source for files not available in the end-user copy of sources listed in the catalog file.

In an embodiment of the present disclosure, prior to replicating the master software installation on the target drive 22, the rebuilder application may be configured to create a partition on the target drive 22 and/or format the target drive 22 and/or mount the target drive 22. The partitioning, formatting, and/or mounting is configured to be accomplished using: a set of functions or software tools available with the OS under which the rebuilder application runs; an end-user copy of sources; or code contained within the rebuilder application.

It is to be understood that the target drive 22 may be any repository that is configured to contain a complete and consistent software or operating system installation including a real fixed or removable disk drive, a virtual disk drive, a local folder, or remote folder.

Examples of suitable repositories for the target drive 22 include, but are not limited to:

a fixed hard disk drive (HOD) connected to the computer running the rebuilder application; the connection can be made through a Serial Advanced Technology Attachment (SATA) cable or connector, a Parallel Advanced Technology Attachment (PATA) cable or connector, a Small Computer System Interface (SCSI) cable or connector, etc.;

an external HOD connected to the computer running the rebuilder application; the connection can be made through a Universal Serial Bus (USB) cable or connector, a firewire (IEEE 1384) cable, etc.;

a Virtual Disk file such as VMWare® .vmdk files, Microsoft® .vhd files, Hewlett-Packard® Image Manager .vol files, etc.; the file is made available to the computer running the rebuilder application through a virtualization software that makes the file appear as a disk drive; and a set of shared folders available to the computer running the rebuilder application. Each folder in the set may be a partition on the target drive 22. Usually, such a repository would be built by sharing the root folders of each of the partitions of a physical or virtual drive so that the computer running the rebuilder application can have full control of these folders. In the case where shared folders are used, some of the operations are not available to the rebuilder application, such as partitioning and formatting (because these operations are available when using disk repositories, not when using folder repositories). The operations that are not available in this case would then have to be performed by the end-user, perhaps manually, and usually prior to running the rebuilder application. Due to these limitations, using shared folders as the repository for target drive 22 could be made unavailable by the rebuilder application if the master software installation to rebuild does not allow use of a shared folders repository. The catalog the could contain instructions to not allow use of a shared folders repository.

The rebuilder application may be instructed by rules in catalog file to partition the target drive 22 prior to replicating the master software installation on the target drive 22 using a set of functions provided by the OS operating the computer that runs the rebuilder application, provided by components included in the master software installation, or by using code contained within the rebuilder application. In a case where the partitioning code is contained within the rebuilder application, the rebuilder application may be configured with the system support directly within the rebuilder application so that it can perform file-system based operations even if the OS that runs the rebuilder application cannot access the kind of the system used in target drive 22. For example, a rebuilder application running on Windows OS could embed third extended the subsystem (ext3) support in order to rebuild a target drive 22 containing a Linux installation installed on an ext3 file system.

Similarly, the rebuilder application could embed support to mount a specific file system even if the OS that operates the computer that runs the rebuilder application does not have such support to mount the file system. For example, a rebuilder application running on Windows OS could embed Unix file system (ufs) support in order to rebuild a target drive 22 containing a FreeBSD installation installed on a Unix the system.

Figure 5:
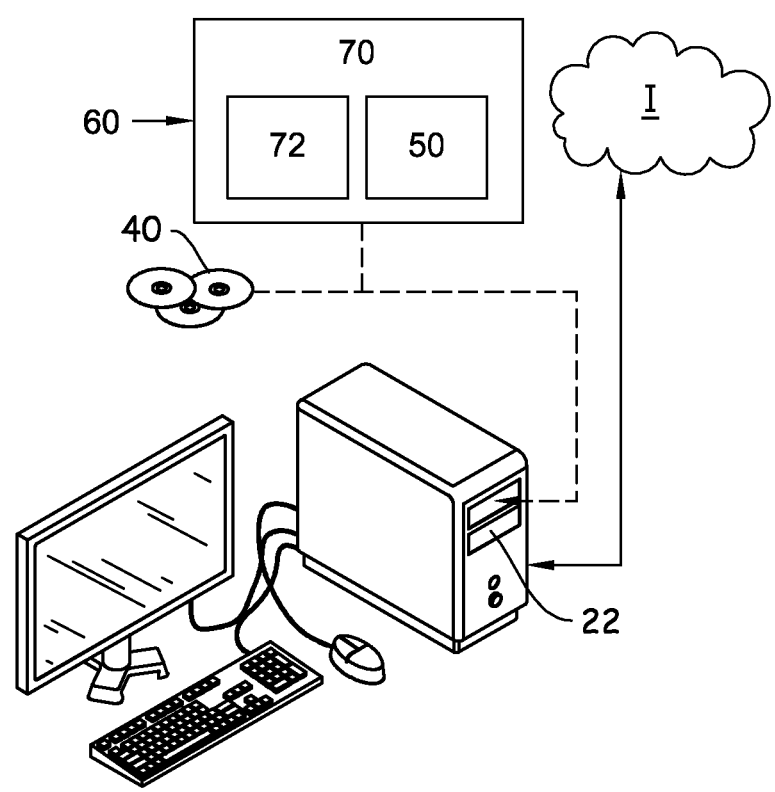
FIG. 5 is a semi-schematic perspective view of a target computer system with a self-contained environment, for use with embodiments of the present disclosure.

Referring now to FIG. 5, embodiments of the method and computer-readable medium 60 as disclosed herein allow providing to end-users a self-contained environment 70, if desired. Self-contained environment 70 may use an open-source operating system 72 to boot (operate) a computer available to the end-user and to run the rebuilder application from the self-contained environment 70. For example, a self-contained environment 70 may include: a bootable Linux OS, a rebuilder application (as a Linux executable file), the catalog file, and the source package 50. In embodiments disclosed herein, the self-contained environment 70 is at least as available for distribution as each of the components in the environment 70 is available for distribution.

The end-user may install (copy) the self-contained environment 70 on, e.g., a USB stick/drive (or any bootable drive, such as a CD-R or DVD-R) so that a computer available to the end-user can boot off the self-contained environment 70. The self-contained environment 70 could boot a computer at the end-user site. It is to be understood that the computer can be the actual target computer (on-line case) or any other computer having access to the target drive 22 (off-line case). In the off-line case, after rebuilding the target drive 22, the target drive 22 would be connected to the target computer which will boot off the target drive 22.

In embodiments including the self-contained environment 70, the rebuilder application may run (from the self-contained environment 70 that booted the computer) and rebuild the target drive 22. The rebuilder application would ascertain that the end-user possesses or has access to each of the sources included in the catalog file. For example, an embodiment including a self-contained environment 70 could restore a Microsoft® Windows™ based target drive 22, as long as the environment 70 and/or the rebuilder application provides access to the file system that is specified (e.g., as a rule) in the catalog file to be used by the target drive 22, and is able to perform the needed adaptations, such as modifying the registry.

It is to be understood that a file system on the target drive 22 may differ from the source file system. For example, a Windows XP installation may have an NTFS source file system, yet have a FAT32 target file system. In this example, security information may be lost, but the file system on the target drive 22 will operate in a suitable manner.

The rebuilder application may be instructed by some entries in the catalog file to validate and correct or modify configuration data on the target drive 22. Validating and correcting or modifying configuration data may include modifying a registry or a system setting on a target drive 22. If a Microsoft® Windows™ OS is on the target drive 22, the rebuilder application may use, for example, an off-line registry (load-hive) mechanism to modify the registry in target drive 22. In another example, the rebuilder application may modify or remove the letters associated with partitions, reset the known disk drives, etc.

In an embodiment, the rebuilder application may be instructed by entries in the catalog file to validate and modify the OS in the boot configuration entries for a target drive 22, so that a boot operation will be possible from the active (bootable) partition of target drive 22 when the active partition is used as a system partition. In a non-limitative example, the rebuilder application may be instructed to validate and modify a Windows 2000/XP/2003 boot.ini entry for a target partition. The rebuilder application may modify boot data entries on the target drive 22 so that the OS on the drive will have the correct behavior: for example, the rebuilder application may modify "Boot Configuration Data" used with Windows™ Vista, Windows™ 7, Windows™ 2008 and with (U)EFI based computers. In another example, the rebuilder application may modify Linux loader configurations.

According to embodiments as disclosed herein, after running the rebuilder application, each device operable by the master software installation is operable by a computer booted off the target drive 22, as the target drive 22 is, functionally, an exact copy of the source drive. If the master software installation can operate heterogeneous hardware, the target drive 22 can also operate the same hardware platforms. For example, if the master software installation can operate VMWare VMs, HP t5730 thin/streaming clients, and one model of Blade PC or Workstation, the target drive 22 after the rebuilder application is completed will also be able to operate these devices.

It is to be understood that after the target drive 22 has been restored, an end-user may enter post-deployment details, e.g., the computer name, product keys, etc.

Further, as is apparent from the disclosure herein, the present disclosure also includes circuitry suitable for performing embodiments of the present disclosure. It is to be understood that this circuitry (non-limiting examples of which are shown in FIGS. 1 and 2) may include, but is not limited to software, hardware, and firmware, either alone or in any combination or frequency thereof.

While several embodiments have been described in detail, it will be apparent to those skilled in the art that the disclosed embodiments may be modified. Therefore, the foregoing description should be considered as providing one or more illustrative examples.

What is claimed is:

1. A method for creating a restorable computer installation, comprising:
   performing a master software installation on a master drive in a computer system using sources of files available to an end-user;
   creating a source package including files that cannot be restored from the sources of files used in the master software installation;
   excluding a file from the source package; and
   including restore information in a catalog record of a catalog file, the catalog record corresponding to each file in the master software installation,
      wherein the computer installation is configured to be restored by running a rebuilder application, the rebuilder application configured to carry out the following steps:
      validating that the end-user possesses or can access each of the sources included in the catalog file that is not in the source package;
      interrupting running of the rebuilder application, or displaying a warning if the end-user does not possess or cannot access each of the sources included in the catalog file; and
      replicating the master software installation on a target drive using the catalog file as an instruction set, using:
         an end-user copy of sources listed in the catalog file; and
         the source package as the source for files not available in the end-user copy of sources listed in the catalog file.

2. The method for creating a restorable computer installation as defined in claim 1, further comprising recording details about the master software installation file system in the catalog file or in another file, the details including at least one of: type of file system; number of partitions; and size of each partition in megabytes (MB) or a percentage of total drive space.

3. The method for creating a restorable computer installation as defined in claim 1, wherein a target drive is a repository that is configured to contain at least one of a complete and consistent software installation or Operating System installation including a real fixed or removable disk drive, a virtual disk drive, a local folder, or a remote folder.

4. The method for creating a restorable computer installation as defined in claim 1, wherein the master software installation includes an operating system installation.

5. The method for creating a restorable computer installation as defined in claim 1, further comprising configuring the computer system to achieve functionality including setting a firewall rule, configuring a policy, creating a user account, creating a script, applying security to a file, and other configuration tasks.

6. The method for creating a restorable computer installation as defined in claim 1, wherein the catalog file is constructed by a cataloger application wherein each catalog record contains security information, and a target drive has the same or substantially the same security information as the master drive for each object of a file system restored on the target drive.

7. The method for creating a restorable computer installation as defined in claim 1, wherein creating the source package is performed by a cataloger application or a packager application.

8. The method for creating a restorable computer installation as defined in claim 7 wherein creating the source package is performed by the cataloger application, and wherein the cataloger application is configured to run on-line or off-line.

9. A non-transitory computer-readable medium encoded with a data structure configured to run as a rebuilder application for restoring a computer installation, the rebuilder application configured to carry out the following steps:
   validating that an end-user possesses or can access each source included in a catalog file that is not in a source package, the source package including files that cannot be restored from sources of files used in a master software installation;
   interrupting running of the rebuilder application, or displaying a warning if the end-user does not possess or cannot access each source included in the catalog file, restore information being included in a catalog record of the catalog file, the catalog record corresponding to each file in the master software installation; and
   replicating the master software installation on a target drive using the catalog file as an instruction set, using:
      an end-user copy of sources listed in the catalog file; and the source package as the source for files not available in the end-user copy of sources listed in the catalog file.

10. The computer-readable medium as defined in claim 9 wherein the rebuilder application is further configured to at least one of: create a partition on the target drive; format the target drive; or mount the target drive prior to replicating the master software installation on the target drive, the partitioning, formatting and mounting each configured to be accomplished using: a set of functions or software tools available with Operating System software under which the rebuilder application runs; an end-user copy of sources; or code contained within the rebuilder application.

11. The computer-readable medium as defined in claim 9, wherein the rebuilder application is further configured to validate and modify configuration data for Operating System software under which the rebuilder application runs.

12. The computer-readable medium as defined in claim 9, wherein validating and modifying configuration data includes validating and modifying the operating system in boot configuration entries for the target drive, whereby the target drive is configured to boot when the target drive is used as a system drive.

13. The computer-readable medium as defined in claim 9, further comprising a self-contained environment wherein a computer available to the end-user is configured to boot and run the rebuilder application from the self-contained environment.

14. The computer-readable medium as defined in claim 13 wherein the self-contained environment includes:
- a bootable, open-source operating system operably installed on the computer-readable medium, the rebuilder application being configured to be executable by the open-source operating system;
- the catalog file; and
- the source package.

* * * * *